United States Patent Office 3,542,724
Patented Nov. 24, 1970

3,542,724
POLYMERS STABILIZED WITH COMBINATIONS OF A SULFUR-CONTAINING COMPOUND AND A PHOSPHITE
Stanley B. Mirviss, Stamford, Conn., and Carl C. Greco, Bronx, N.Y., assignors to Stauffer Chemical Company, New York, N.Y., a corporation of Delaware
No Drawing. Filed June 3, 1968, Ser. No. 733,827
Int. Cl. C08f 45/58, 45/62
U.S. Cl. 260—45.7                    10 Claims

ABSTRACT OF THE DISCLOSURE

A solid polymeric composition consisting essentially of a solid polymer selected from the class consisting of a hydrocarbon, a substituted hydrocarbon, a polystyrene, a vinyl polymer and copolymers and terpolymers thereof, stabilized against color degradation by incorporating therein a stabilizing quantity of a stabilizer consisting of a mixture of a dialkyl phosphite ester composition and a sulfur-containing composition. The phosphite ester having the following formula:

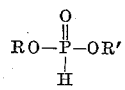

wherein R and R' can each be selected from the group consisting of an aryl or arylalkyl group each having from 1 to 50 carbon atoms. The sulfur-containing composition having the formula:

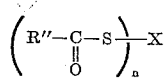

wherein R" is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusive.

BACKGROUND OF THE INVENTION

It is well known that plastics and polymeric materials generally are susceptible to a characteristic type of degradation when exposed to heat during the conventional milling and so forth of the polymeric compositions. In particular, chlorovinyl polymers such as polyvinyl chloride undergo discoloration and degradation at the elevated temperatures required for operations such as molding and product formation. In order to overcome this problem, a suitable amount of a heat stabilizing composition is generally blended with plasticized or unplasticized resinous material prior to molding. One suitable component of a commercial stabilization compound employed widely today is stearic acid salts. Stearic acid derivatives have found wide acceptance because they are readily available at a low cost and are generally non-toxic. Unfortunately, stearic acid salts are unstable for general use at high processing temperatures required to work with the rigid, unplasticized polyvinyl chloride and permit discoloration and aggregation after a relatively short period of time, even at the lower temperature of about 310° F. required for processing of flexible color plasticized polyvinyl chloride. Other known plasticizers for polyvinyl chloride include the organotin compounds, which because of their unusual heat stabilizing properties, set a standard for heat stability which is difficult to equal. However, the organotin compounds have the disadvantage that they are very expensive and some are rather toxic, which greatly limits their scope of application.

More recently, it has been proposed to employ thiol anhydrides such as thiolauric anhydride, thioloeic anhydride, thiolbenzoic anhydrid and thiolstearic anhydride. These stabilizers do, in fact, impart greater stability to the polymeric compositions during normal operations of working of the polymers, but a gradual color degradation has been noted. This side effect cannot be tolerated where a clear or colorless polymer is needed. Other side effects encountered are odor production, softening, bleeding, and the like. From a commercial standpoint, it is desirable that the stabilizer be readily available or economical to manufacture.

BRIEF DESCRIPTION OF THE INVENTION

It has been discovered that excellent stabilization of polymers can be achieved without encountering the aforesaid undesirable side effects by incorporating into the polymer a small amount of a dialkyl phosphite composition which greatly reduces the color formation at the elevated temperatures. The dialkyl phosphite composition can be in the form of an organic material having the following formula:

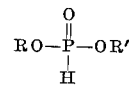

wherein R and R' can each be selected from an alkyl, aryl or aryl-alkyl group each having from 1 to 50 carbon atoms.

Excellent color stabilization has been achieved when the above-noted phosphite composition is combined with a composition having the formula:

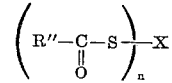

wherein R" is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusive.

DETAILED DESCRIPTION OF THE INVENTION

In practicing the present invention, the phosphite material is blended or incorporated into the polymer by any of the conventional methods commonly employed for mixing such materials with resins or plastics. A typical procedure comprises milling on heated rolls, although deposition with solvents and dry blending are well known techniques. The phosphite esters are well known chemical entities, the description and preparation of which can be found in the technical and chemical literature. Specific phosphites usable with this invention may be selected from the group consisting of di-n-octadecyl phosphite, dibenzyl phosphite, didecyl phosphite, dilauryl phosphite, diphenyl phosphite, diisooctyl phosphite, dicyclohexyl phosphite.

In using the stabilizers of this invention, it has been found that they are effective in protecting poly-α-olefins, diolefins, copolymers of olefins, or olefins and diolefins and other hydrocarbon polymers, polymers of substituted vinyl compounds and polyesters against deterioration and formation of color bodies due to the exposure to heat. The polymer compositions stabilized in accordance with this invention exhibit an extended life expectancy and are much more useful and practical than unstabilized polymers and possess a wide variety of uses including installations requiring prolonged exposure to sunlight and the elements. Moreover, the phosphite compounds, although inordinately effective as stabilizers, do not produce any undesirable side effects. In particular, the phosphite compositions exhibit exceptional stability against color degradation when combined with a thiol acid anhydride represented by the formula:

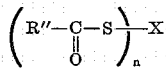

$$\left(R''-\underset{\underset{O}{\|}}{C}-S\right)_{n}\!\!-X$$

wherein R'' is a hydrocarbonyl compound containing from 3 to about 21 carbon atoms, $n$ is an integer having a value of 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusively. Examples of these thiol acid anhydride stabilizers are thiolauric anhydride, thioloeic anhydride, thiolbenzoic anhydride, thiolstearic anhydride and the like.

When employing the combination of stabilizers such as illustrated by the thiol acid anhydrides and the phosphite composition, the amount present should be between 0.1 and 10.0 parts by weight of the anhydride to between 0.05 and 3.0 parts by weight of the phosphite composition. The amounts are based on 100 parts resin. The thiol anhydrides are also well known chemical entities, the description and preparation of which can be found in technical and chemical literature.

The polymer stabilized as contemplated herein can be cast, extruded, rolled or molded into sheets, rods, tubes, piping, filaments and other shaped articles, including sheets or films ranging from 0.5 to 100 mills in thickness. The polymer compositions of this invention can be applied as coatings to paper, cloth, wire, metal foil and are suitable for manufacture of synthetic fibers and fabrics. Although the quantity of stabilizer is not particularly critical, it is recommended that the concentration based on the weight of the polymer be maintained in the neighborhood of between 0.1% to about 10% by weight.

The phosphite materials as described herein are suitable for stabilizing a wide variety of solid polymer compositions against deterioration brought on by heat. In this connection, mention is made of any of the normally solid polymers derived from the polymerization of α-monoolefinic aliphatic and aryl substituted aliphatic hydrocarbons containing from 2 to 10 carbon atoms. Typical poly-α-olefins include polyethylene, polypropylene, poly(3-methylbutene-1), poly(4-methylbutene-1), poly(4-methylpentene-1), poly(pentene-1), poly(3,3-dimethylbutene-1), poly(4,4-dimethylbutene-1), poly(octene-1), poly(decene-1), polystyrene and the like. Copolymers of such olefins are those prepared with ethylene and propylene or ethylene and the butenes or the like are also protected as are polydiolefins, i.e., polybutadiene, or polyisoprene and olefin-diolefin copolymers of the type as butadiene-styrene or isobutylene-isoprene copolymers. Polymeric materials prepared from olefins and/or diolefins containing some vinylic monomers such as acrylonitrile or vinyl chloride as illustrated by the so-called ABS resins, acrylonitrile, butadiene and styrene terpolymers, are considered to be within the scope of this invention as are homopolymers of substituted vinyl monomers such as vinyl chloride, vinyl iodine dichloride, vinyl acetate, acrylonitrile and the like. Polyester resins with or without added styrene, divinyl benzene and the like are also stabilized by means of the phosphite materials.

Although the molecular weight of the polymers varies over wide limits, the stabilizer compounds of this invention are not restricted to any particular molecular weight range of polymer, and in fact it has been found that excellent protection can be realized with polymers having a broad or narrow range. Moreover, the so-called amorphous low molecular weight poly-α-olefin waxes or oils are likewise susceptible to the stabilization by means of the compound of this invention.

Polyesters which can be protected against ultraviolet radiation such as by means of hydroxybenzophenones or aryl salicylates are well known chemical entitles and are described at length in technical literature and numerous U.S. patents. One type of polyester is derived from the addition polymerization of ethylenically unsaturated organic esters, particularly vinyl ester monomers, and in this connection mention is made of acrylic esters, vinyl esters, and the like. The polymerization is commonly effectuated by contacting the monomer with a polymerization initiator such as an organic peroxide with or without the application of heat.

Another type of polyester which can be stabilized in accordance with this invention is formed by the successive esterification of dicarboxylic acids with polyglycols. The resulting polymeric esters consist of alternate linkages of the dicarboxylic acid and polyglycol residues produced by the elimination of water from between the reactants. The resulting polymers may be linear or cross-linked, depending on the selection of the components. For instance, a diglycol wherein the hydroxyl groups are terminally situated produce a linear type of polyester whereas polyglycols as exemplified by glycerol give rise to a cross-linking polymer formed by reacting glycerol with the dicarboxylic acid, such as phthalic acid, in the form of its anhydride.

Modifications of polyesters are the well known alkyd resins which are obtained by forming a polyester by reacting a polyglycol and an α-β-ethylenically unsaturated di or polycarboxylic acid or anhydride such as maleic anhydride and cross-linking the residual ethylene double bond with a suitable cross-linking agent.

In a more specific and detailed sense, the alkyd resins as above referred to having a plurality of polymerizable α-β-ethylenically unsaturated linkages may be produced by combining together a polyhydric alcohol with a polycarboxylic acid or its anhydride which contains α-β-ethylenic unsaturation. It is generally understood that the acid or its anhydride includes the designation polycarboxylic acid and such terminology will be understood in the description as herein set forth. Saturated carboxylic acids are also frequently included in the reaction mixture for the purpose of modifying the properties of the resin. From the standpoint of cost, the unsaturated polycarboxylic acids most commonly used are maleic, usually in the form of anhydride, and fumaric acid. Other α-β-unsaturated carboxylic acids which may be employed are exemplified by citraconic, itaconic, aconitic and mesaconic acids. The chemical and technical literature can be consulted for the names of other suitable acids. An acid often used for modifying the properties of a polyester resin is phthalic acid, commonly in the form of its anhydride. Other such acids with benzenoid or aromatic unsaturation which behave as saturated acids in that their benzenoid unsaturated structure does not enter into any common ethylenic type polymerization are commonly selected to produce various and particular properties and effects in the alkyd resin. In this connection, reference is made to such acids as isophthalic, adipic, azelaic, tetrachlorophthalic acid, sebacic, suberic, endomethylenetetrahydrophthalic and hexachloroendomethylenetetrahydrophthalic.

As illustrative of the polyhydric alcohols applicable for the synthesis of alkyd resins, mention is made of ethylene glycol, diethylene glycol, propylene glycols, dipropylene glycol, butylene glycol and the like. Here again, the literature may be consulted for the names of the less common polyglycols. It should be pointed out that as with the dicarboxylic acid a polyglycol alcohol may be selected which is ethylenically unsaturated and thereby giving residual ethylenic double bonds for the purpose of cross-linking the polyester with concomitant modification in physical and chemical properties.

In preparing an alkyd resin, the polycarboxylic acid and appropriate polyhydric alcohol are commonly reacted at elevated temperatures in the presence of an inert atmosphere. The reaction is normally carried out at a temperature ranging from about 150° C. to about 230° C.; the inert atmosphere is conveniently provided by carbon dioxide or nitrogen gas. Generally, the total number of moles of alcohol exceed the total number of moles of acid by about 5 to 20% since the latter figures are required to effect complete esterification, although the proportions are not critical. A relatively inert organic solvent such as xylene is sometimes useful in carrying out the reaction. Since the reaction is an esterification, water is given off and should be removed from the system. After essentially all of the water has been expelled, any solvent is removed and after the mixture cooled, the appropriate unsaturated monomeric cross-linking agent added. If cross polymerization or linkage is to be prolonged, the presence of a suitable inhibitor is necessary.

Unsaturated monomers suitable for use as cross-linking agents can be selected from a wide variety of polymerizable compounds characterized by the presence of a $CH_2=CH-$ group. Examples of such monomers are styrene, vinyl toluene, methyl acrylate, divinyl benzene, diallylphthalate, dimethyl styrene, methyl methacrylate, vinyl acetate, butadiene and the like. It is also a common practice to employ special monomers in order to secure particular effects. In this connection, mention is made of triallyl cyanurate useful in imparting high heat resistance to the resins, alkylallyl diglycolate for use as a refractive modifier, while dialkyl phenylphosphonate has been employed to impart fire resistance.

Three groups of components which have been found particularly suitable and convenient for preparing polyesters are: (1) acids such as maleic, fumaric, itaconic, phthalic and the like; (2) alcohols or glycols such as allyl alcohol, ethylene glycol and diethylene glycols; (3) unsaturated hydrocarbons such as styrene, cyclopentadiene and the like. Also polyesters containing an alkenyl aryl cross-linking agent such as diallyl phthalate, and a reaction product of an $\alpha$-$\beta$-ethylenically unsaturated polycarboxylic acid, such as maleic or fumaric acid, a saturated polycarboxylic acid free of non-benzoid unsaturation, such as phthalic acid and at least one glycol such as ethylene glycol and/or diethylene glycol, may be used.

The amounts of the components useful in preparing polyesters may vary widely. In most instances, approximately two parts by weight of an unsaturated alkyd resin to one part by weight of the monomeric cross-linking agent is suitable, although as above mentioned, the proportions may be varied over wide limits.

Another important polymer which can be stabilized in accordance with this invention is polyvinyl chloride. This polymer is commonly produced by the emulsion polymerization using a redox initiator for polymerizing vinyl chloride. One type of polyvinyl chloride is the so-called rigid or unplasticized polyvinyl chloride and this particular modification of polyvinyl chloride can be effectively stabilized by the compounds of the invention. As has been previously pointed out elsewhere herein, the phosphites are effective as stabilizers either for the polymers themselves or various copolymers and terpolymers and mixtures thereof. One class of polymer compositions which lend itself to stabilization by means of the compounds of the invention is resin mixtures which are blends or copolymers of a plastic such as polystyrene or styrene acrylonitrile copolymer with a rubber, usually a butadiene acrylonitrile copolymer. Such compositions may be intimate physical mixtures of the two components, the so-called poly blends or a true terpolymer, that is an ABS resin possibly produced block or graft techniques. An example of the latter case is a graft copolymer of styrene on nitrile rubber. Typical compositions include 20 to 30% acrylonitrile, 20 to 30% butadiene and 40 to 60% styrene. The abbreviations ABS are taken from the initial letters of the three monomers.

The following examples illustrate the procedure for preparing stabilized polymer compositions of the invention, although the inclusion of such examples is not to be taken as limiting or otherwise imposing any restriction on the invention, and it is to be understood that variations in practicing the same without departing from the scope or spirit thereof will be apparent to those skilled in the art to which this invention pertains.

EXAMPLE 1

A polyvinyl chloride resinous formulation was blended by adding 100 parts of the polyvinyl chloride to a mixing vessel along with 30 parts of dialkyl phthalate and mixed thoroughly. Thereafter, three parts of thiolauric anhydride along with 0.5 part stearic acid and 0.5 part di-n-octadecyl phosphite were added and thoroughly blended therewith. The formulation was hand stirred and then poured into a two roll mill at 350° F. The shear ratio of the rolls was 1:1.4. A control formulation was made omitting the di-n-octadecyl phosphite. Five minutes after the material was poured on the mill a sample was taken. Thereafter, samples were removed at ten minute intervals. The samples so obtained were measured on a Hunter D-25 Color Difference Meter and from the 1, $a$ and $b$ values obtained, the total color difference $\Delta E$ was calculated, employing the formula $$\Delta E = \sqrt{(\Delta 1)^2 + (\Delta a)^2 + (\Delta b)^2}$$

A $\Delta E$ value of 1 is arbitrarily set as the smallest color difference a color matcher can detect by eye. The $\Delta E$ values of the samples obtained are tabulated below:

| Material | $\Delta E$ values of samples Time from band | | | | |
| --- | --- | --- | --- | --- | --- |
|  | 0.0 | 10.0 | 20.0 | 30.0 | 40.0 |
| Di-n-octadecyl phosphite | 6.04 | 8.03 | 11.90 | 16.16 | 19.8 |
| Control | | 13.58 | 20.43 | 25.78 | 31.07 |

EXAMPLE 2

The formulation as set forth in Example 1 was repeated in its entirety except dibenzyl phosphite was employed in lieu of the di-n-octadecyl phosphite. The results obtained are set out below:

| Material | $\Delta E$ values of samples Time from band | | | | |
| --- | --- | --- | --- | --- | --- |
|  | 0.0 | 10.0 | 20.0 | 30.0 | 40.0 |
| Dibenzyl phosphite | 5.04 | 8.65 | 19.82 | 20.96 | 21.20 |
| Control | | 13.58 | 20.43 | 25.78 | 31.07 |

EXAMPLE 3

When the procedure of Example 1 is repeated but substituting polyethylene in lieu of polyvinyl chloride, the results paralleled those obtained in Example 1.

EXAMPLE 4

The procedure of Example 1 was repeated but in this case the polymer was a terpolymer obtained by polymerizing a mixture of acrylonitrile, butadiene and styrene. The terpolymer used in this example was of high impact type, commonly referred to in the trade as ABS polymers. The results obtained were in general agreement with Example 1.

EXAMPLE 5

The procedure of Example 1 was repeated by formulating two different resin containing stabilizers. In this instance 0.1 part by weight di-n-octadecyl phosphite and 1.0 part by weight di-n-octadecyl phosphite was employed respectively in each formulation. The results obtained paralleled the results of Example 1.

EXAMPLE 6

When the procedure of Example 1 is repeated but substituting polyethylene in lieu of polyvinyl chloride, the results parallel those of Example 1.

What is claimed is:

1. A solid polymer composition comprising a solid polymer selected from the class consisting of:
    (a) a solid polymer derived from the polymerization of alpha-monoethylenically unsaturated aliphatic hydrocarbons, their aliphatic and aryl substituted derivatives and copolymers of said alpha-monoethylenically unsaturated aliphatic hydrocarbons with monoethylenically unsaturated monomers;
    (b) a solid polymer derived from the polymerization of diolefins and copolymers of said diolefins with monoethylenically unsaturated monomers;
    (c) a solid polymer derived from the polymerization of nitriles of ethylenically unsaturated carboxylic acids and copolymers of said nitriles with monoethylenically unsaturated monomers;;
    (d) vinyl halide homopolymers and copolymers of said vinyl halides with monoethyenically unsaturated monomers;
    (e) homopolymers derived from the addition polymerization of alkyl esters of monomethylenically unsaturated carboxylic acids and the copolymers of said esters with monoethylenically unsaturated monomers, and as a stabilizer therefore a stabilizing quantity of a stabilizing mixture consisting of (1) from between about 0.05 to about 3.0 parts by weight of a phosphite ester material having the following formula:

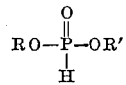

wherein R and R' can each be selected from the group consisting of an alkyl, aryl or arylalkyl group, said alkyl group and the alkyl portion of said arylalkyl group each having from 1 to 50 carbon atoms, and (2) from between about 0.1 to about 10 parts by weight of a composition having the formula:

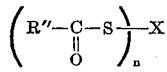

wherein R" is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbon group containing from 1 to 17 carbon atoms, said parts by weight being based on 100 parts of said solid polymer.

2. The composition according to claim 1 wherein said solid polymer derived from the polymerization of alpha-monoethylenically unsaturated aliphatic hydrocarbons is a poly-alpha olefin.

3. The composition according to claim 1 wherein the solid polymer is a vinyl halide homopolymer.

4. The composition according to claim 3 wherein the vinyl halide homopolymer is polyvinylchloride.

5. The composition according to claim 1 wherein the solid polymer is derived from an aryl-substituted alpha-monoethylenically unsaturated monomer.

6. The composition according to claim 5 wherein said monomer is styrene.

7. The composition according to claim 1, wherein the solid polymer is a poly diolefin.

8. The composition according to claim 2, wherein the poly-α-olefin is polypropyene.

9. The composition according to claim 2, wherein the poly-α-olefin is polyethylene.

10. A stabilizer composition consisting essentially of a mixture of (1) a dialkyl phosphite ester having the formula:

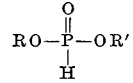

wherein R and R' can each be selected from an alkyl, aryl or arylalkyl group, the said alkyl group and the alkyl portion of said arylalkyl group each having from 1 to 50 atoms; and (2) a composition having the formula:

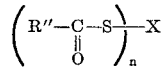

wherein R" is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbyl group containing from about 1 to about 17 carbon atoms inclusive.

References Cited

UNITED STATES PATENTS

| | | | |
|---|---|---|---|
| 2,191,266 | 2/1940 | Williams et al. | 260—761 |
| 2,564,646 | 8/1951 | Leistner et al. | 260—45.7 |
| 2,854,325 | 9/1958 | Searle | 260—502.6 |
| 3,143,584 | 8/1964 | Roberts et al. | 264—210 |
| 3,461,091 | 8/1969 | Stamm | 260—23 |

DONALD E. CZAJA, Primary Examiner

R. A. WHITE, Assistant Examiner

U.S. Cl. X.R.

252—400, 406

PO-1050
(5/69)

UNITED STATES PATENT OFFICE
CERTIFICATE OF CORRECTION

Patent No. 3,542,724      Dated November 24, 1970

Inventor(s) Stanley B. Mirviss, Carl C. Greco

It is certified that error appears in the above-identified patent and that said Letters Patent are hereby corrected as shown below:

Column 5, line 70, after "produced" insert the word --by--;

Column 7, line 2 (Example 6), delete the word "polyethyl(e) and insert in lieu thereof the word --polystyrene--;

Column 7, line 25 (Claim 1 e), delete the word "monomethylenically" and insert in lieu thereof the word --monoethylenically--.

Signed and sealed this 30th day of March 1971.

(SEAL)
Attest:

EDWARD M. FLETCHER, JR.      WILLIAM E. SCHUYLER, JR.
Attesting Officer      Commissioner of Patents